United States Patent [19]

Boyle

[11] Patent Number: 5,183,789
[45] Date of Patent: Feb. 2, 1993

[54] OZONE REGENERATION OF PLATINUM, AND POLYMETALLIC PLATINUM REFORMING CATALYSTS

[75] Inventor: Joseph P. Boyle, Baton Rouge, La.

[73] Assignee: Exxon Research and Engineering Company, Florham Park, N.J.

[21] Appl. No.: 667,120

[22] Filed: Mar. 11, 1991

[51] Int. Cl.$^5$ .................... B01J 23/96; B01J 38/14; C10G 35/09; C10G 35/085
[52] U.S. Cl. .................................. 502/52; 208/140; 502/38
[58] Field of Search ............... 502/38, 52; 208/140

[56] References Cited

U.S. PATENT DOCUMENTS

| | | | |
|---|---|---|---|
| 1,678,626 | 7/1928 | Jaeger | 502/38 |
| 4,467,045 | 8/1984 | Fuhg | 208/140 |
| 4,600,700 | 7/1986 | McHale | 502/52 |

OTHER PUBLICATIONS

R. G. Copperthwaite, G. J. Hutchings, P. Johnson, S. W. Orchard, Ozone Reactivation of A Synthetic Zeolite Catalyst for Methanol Conversion J. Chem. Soc., Chem. Commun. 1985, pp. 644–645.
R. G. Copperthwaite, G. J. Hutchings, P. Johnston, S. W. Orchard, Regeneration of Pentasil Zeolite Catalysts Using Ozone and Oxygen, J. Chem. Soc., Faraday Trans. 1, 1986, 82, pp. 1007–1017.
G. J. Hutchings, R. G. Copperthwaite, T. Themistocleous, G. A. Foulds, A. S. Bielovitch, B. J. Loots, G. Howitz, P. van Eck; Applied Catalysis, 34, 1987, pp. 153–161.

Primary Examiner—Paul E. Konopka
Attorney, Agent, or Firm—L. A. Proctor; H. E. Naylor

[57] ABSTRACT

A process for the regeneration of a coked platinum, or polymetallic platinum reforming catalyst with ozone. The coked catalyst is contacted, and carbon burned from the catalyst at temperatures ranging from about 20° C. to 200° C., preferably about 60° C. to 150° C., with a gaseous stream containing ozone in concentration ranging from about 1 to 50 volume percent ozone sufficient to substantially deplete said catalyst of sufficient carbon to restore the activity of the catalyst to that of the corresponding fresh catalyst.

6 Claims, 2 Drawing Sheets

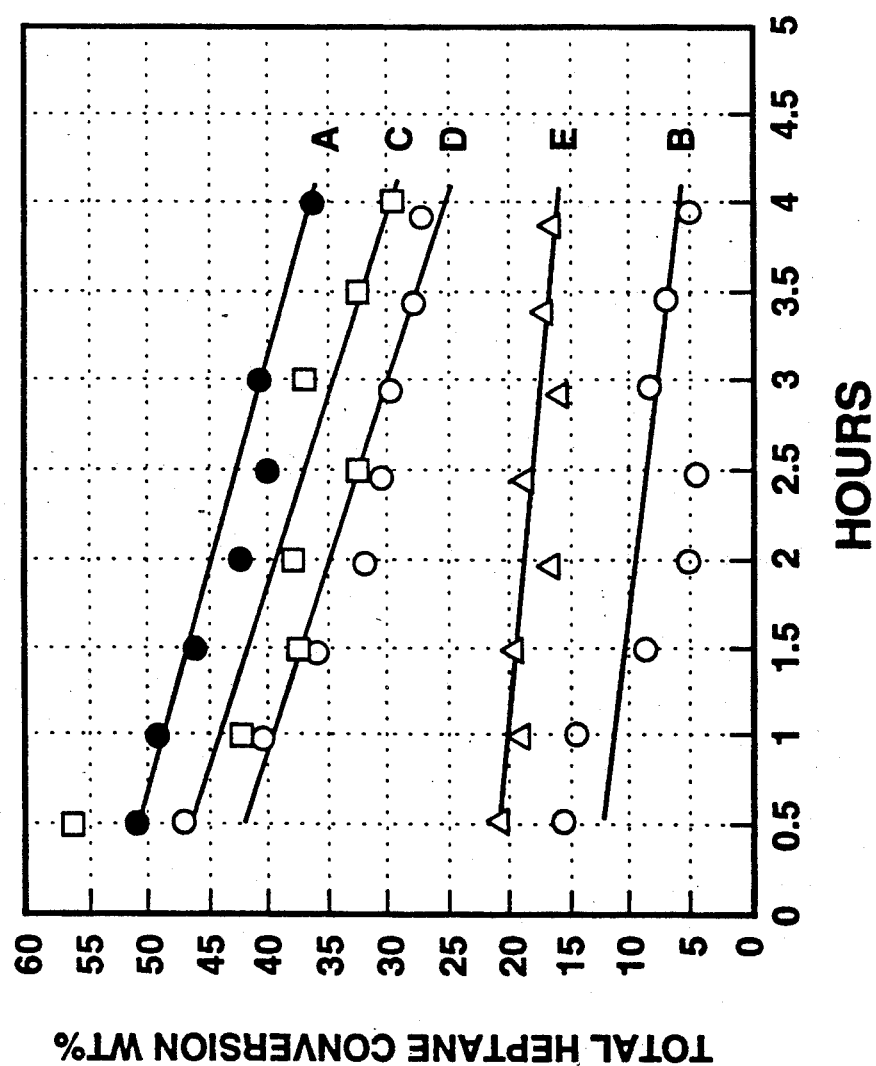

OZONE REGENERATION OF PLATINUM, AND POLYMETALLIC PLATINUM REFORMING CATALYSTS

FIELD OF THE INVENTION

This invention relates generally to the art of catalytic reforming, or hydroforming, to upgrade virgin or cracked naphthas to higher octane products. In particular, it relates to a process for regenerating a coked reforming catalyst.

BACKGROUND

In catalytic reforming processes a platinum, or polymetallic platinum catalyst constituted of an alumina base to which one or more metals have been added with platinum to promote, modify and improve catalyst performance are conventionally employed. Reforming is defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics: and hydrocracking of paraffins which produces gas, and inevitably coke, the latter being deposited on the catalyst. This sequence of reactions occurs across one or a sequence of reactors; typically a sequence of three or four reactors, each of which contains a bed, or beds, of the reforming catalyst. Typically each of the reactors receives downflow naphtha feed, and each is provided with a preheater or interstage heater because the reactions which take place are endothermic.

The activity of the catalyst gradually declines due to the build-up of coke. Coke formation is believed to result from the deposition of coke precursors such as anthracene, coronene, ovalene, and other condensed ring aromatic molecules on the catalyst, these polymerizing to form coke. During operation, the temperature in each of the reactors is gradually raised to compensate for the activity loss caused by the coke deposition. Eventually, however, it is necessary to reactivate the catalyst. Consequently, in all processes of this type the catalyst must necessarily be periodically regenerated by burning the coke off the catalyst at controlled conditions.

Regeneration processes are basically of two types, semi-regenerative and cyclic. In a semi-regenerative process, during the on-oil portion of the operating cycle the entire unit is operated by gradually and progressively increasing the temperature to maintain the activity of the catalyst, caused by the coke deposition, until finally the entire unit is shut down for regeneration, and reactivation, of the catalyst. After regeneration, and reactivation of the catalyst the unit is put back on-oil. In a cyclic regeneration process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series. The cyclic method of regeneration offers advantages over the semi-regenerative type process in that it can be continuously operated because the catalyst can be regenerated, and reactivated, without shutting down the unit. Hence, there is no loss in production, and the unit can be operated at higher severities to produce higher $C_5+$ liquid volume yields of high octane gasoline than semi-regenerative reforming units.

The net result in either type of regeneration however is the same. The coke must be oxidatively burned from the catalyst at temperatures ranging from about 400° C. to about 800° C., and the higher the required temperature, inter alia, the greater the damage to catalyst. Typically for example, the high temperature agglomerates the metal, or metals components of the catalyst, and redispersion of the dispersed metals at these high temperatures is virtually always required. For example, platinum-iridium catalysts are the most active of commercial reforming catalysts. Thus, iridium has the ability to promote the platinum activity and provide catalytic activities two to four times that of the more conventional platinum and, e.g., the now widely used platinum-rhenium catalysts, respectively, depending upon the platinum and iridium loadings. Unfortunately however, platinum-iridium catalysts unlike the platinum and platinum-rheniun catalysts all too readily agglomerate and inactivate upon exposure to oxygen at high temperatures. For this reason the wide application of platinum-iridium catalysts in commercial operations has been restricted, especially to exclude their use in cyclic reforming units, since time-consuming and inefficient regeneration procedures are required to avoid damaging the iridium. Nonetheless, albeit the high temperatures, of regeneration that is required is less damaging to reforming catalysts other than platinum-iridium catalysts, e.g., platinum and platinum-rhenium catalysts, a lower temperature catalyst regeneration process is needed by the industry.

Attempts have been made to regenerate zeolite catalysts at low temperature, as disclosed by (1) Copperthwaite R. G. et al, J. Chem. Soc., Chem. Commun. 1985, p 644–645; (2) Copperthwaite R. G. et al. J. Chem. Soc., Faraday Trans. 1, 1986, 82, p 1007–1017; and (3) Hutchings G. J. et al, Applied Catalysis, 34, 1987, p 153–161. These attempts however do not appear to have been successful; or, at best, can be described as partially successful. In attempts to regenerate 1/16 inch LZY82 extrudates, as described by Hutchings G. J. et al, e.g., only the top portion of the treated bed of catalyst appears to have been regenerated at all, and then only partially regenerated. The bed appeared as a black core of coked catalyst surrounded by a white layer of partially regenerated catalyst. More carbon remained on the catalyst when it was regenerated with ozone, than remained on a similar catalyst regenerated with oxygen. In the regeneration of ZSM-5 powder, as desscribed in the two Copperthwaite R. G. et al publications, generally similar results were obtained. Insofar as known, there is no art suggesting, or describing the regeneration of a metal, or metals-containing catalyst. This, of course, may not be too surprising since it is known that metals catalyze the conversion of ozone to oxygen. The loss of the third oxygen atom reverts the ozone molecule back to oxygen. The regeneration of a coked catalyst with oxygen requires temperatures on the order of at least about 400° C. to about 500° C. or higher; a condition at which temperature alone will convert ozone to oxygen. It would be very advantageous, and indeed a need exists, for a low temperature process for the regeneration of coked platinum and polymetallic platinum catalysts.

OBJECTS

It is, accordingly, a primary object of this invention to supply this need.

In particular, it is an object of this invention to provide a process for the regeneration of platinum or polymetallic platinum catalysts coked during the on-oil portion of a reforming cycle by treatment at low, or substantially ambient temperatures.

A further, and more specific object is to provide a process for the regeneration of coked supported platinum or polymetallic platinum catalysts by burning off the carbon at substantially ambient temperatures, or temperatures sufficiently low to avoid or suppress metals agglomeration and sintering of the support, with lessened energy costs as contrasted with conventional oxygen catalyst regeneraton techniques.

SUMMARY OF THE INVENTION

These objects and others are achieved in accordance with this invention which embodies a process for the regeneration, and burn off of carbon from a coked, supported, platinum, or polymetallic platinum metal, catalyst by contact thereof with a gaseous ozone-containing stream at temperatures ranging from about 20° C. up to, but not exceeding the temperature at which ozone reverts to oxygen. Preferably, the temperature of regeneration ranges from about 20° C. to about 200° C., more preferably from about 60° C. to about 150° C. Suitably, the ozone concentration in the gaseous ozone-containing stream ranges from about 1 percent to about 50 percent, preferably from about 1 percent to about 20 percent, and more preferably from about 3 percent to about 10 percent, based on the total volume of the regeneration gas. The non-ozone component, or components, of the gaseous stream is one which is substantially inert or non reactive with the ozone, and does not react detrimentally with the supported metal, or metals, of the catalyst; exemplary of which is nitrogen, or air.

REFERENCE TO THE FIGURES

The attached FIG. 1 is a graphical interpretation of data on heptane reforming of catalysts of this invention, and catalysts not of this invention, as subsequently exemplified.

DETAILED DESCRIPTION OF THE INVENTION

Figure 1A:
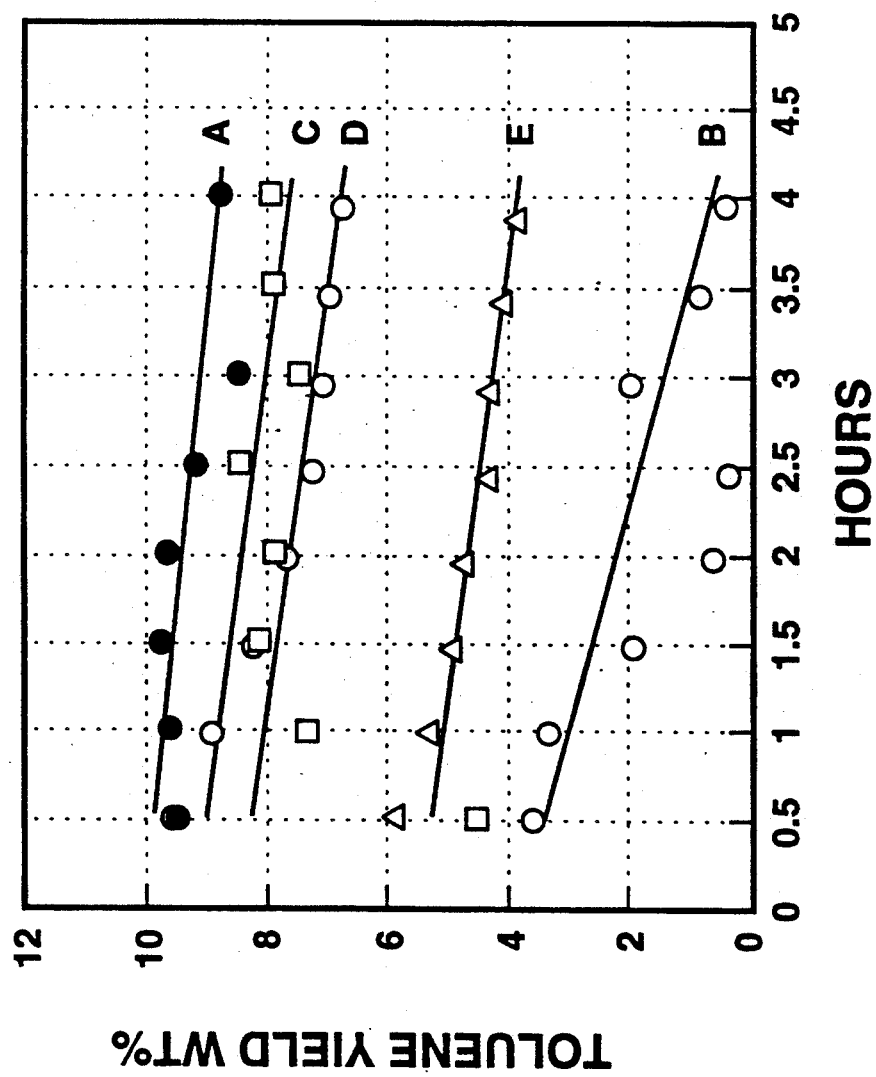

It has been found, in accordance with this invention, that sufficient of the carbon deposited on a supported platinum, or polymetallic platinum catalyst, coked during the on-oil portion of a reforming cycle can be removed using ozone at these low temperatures to restore the activity of the catalyst to essentially that of a fresh catalyst. Moreover, temperature excursions above 200° C. due to combustion with ozone are very unlikely since ozone reverts immediately to oxygen at temperatures above about 200° C. and combustion reactions are halted. This characteristic makes for a self-tempering regeneration process which protects against catalyst metal and base sintering. Energy costs are significantly lowered, and there is minimal sintering of the base, or support, and minimal, if any agglomeration of the metal, or metals. Because of the low temperature requirements of the process, indeed, plant steam can be used to supply the heat rather than a regeneration furnace as required in conventional oxygen catalyst regeneration. Catalysts which can be regenerated pursuant to the practice of this invention are catalysts which contain from about 0.05 percent to about 5 percent, preferably from about 0.05 to about 1.0 percent, based on the weight of the catalyst (dry basis), of platinum, and the platinum can be modified or promoted with one or more additional Group IV, VII or VIII metals (Periodic Chart of the Elements, Fischer Scientific Company, Copyright 1953), particularly tin, iridium, or rhenium, or combination of two or more of the metals deposited or otherwise dispersed (with platinum) on an alumina support, preferably a gamma alumina support. The promoter metal, or metals, where used are also employed in concentration ranging from about 0.05 percent to about 5 percent, preferably from about 0.05 percent to about 1.0 percent, based on the weight of the catalyst (dry basis). Coked, supported catalysts containing these metals, within these levels of concentrations, it was found, could be regenerated with ozone at these low temperatures substantially as effectively as with oxygen at temperatures ranging 400° C. to about 500° C, or higher. Coked catalysts containing carbon at levels ranging from about 2 percent to about 20 percent, based on the weight of the catalyst (dry basis), thus could be contacted with an ozone-containing gaseous stream and the coke burned off to leave a residual carbon level ranging from about 0.05 percent to about 0.5 percent, based on the weight of the catalyst (dry basis). Thus, it was found that from about 85 percent to about 99 percent of the total carbon could be removed from the coked catalyst by the low temperature ozone burn off treatment. Albeit, these metals would be expected to catalyze the conversion of ozone to oxygen this does not happen during the regeneration. Though the reason for this is not known, it is thought perhaps that the coke covers and shields the metals from the ozone until substantially all of the carbon has been burned from the catalyst.

The catalyst employed in accordance with this invention is necessarily constituted of composite particles which contain, besides the alumina support material, platinum or platinum and other hydrogenation-dehydrogenation component, or components, a halide component and, preferably, the catalyst is sulfided. The support material is constituted of a porous, refractory alumina, particularly gamma alumina. The support can contain, besides alumina, bentonite, clay, diatomaceous earth, zeolite, silica, magnesia, zirconia, thoria, and the like; a preferred support being alumina to which is added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g, preferably from about 100 to about 300 m$^2$/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Angstrom units.

The platinum metal, or platinum metal with other hydrogenation-dehydrogenation components can be uniformly dispersed throughout the porous inorganic oxide support by various techniques known to the art such as ion-exchange, coprecipitation with the alumina in the sol or gel form, and the like. For example, the catalyst composite can be formed by adding together suitable reagents such as a salt of tin, and ammonium hydroxide or carbonate, and a salt of aluminum such as aluminum chloride or aluminum sulfate to form aluminum hydroxide. The aluminum hydroxide containing the tin salt can then be heated, dried, formed into pellets or extruded, and then calcined in air or nitrogen. The other metal components can then be added. Suitably, the metal components can be added to the catalyst by impregnation, typically via an "incipient wetness" technique which requires a minimum of solution so that the total solution is absorbed, initially or after some evaporation.

The catalyst to be regenerated will contain carbon in the form of coke, the coke having deposited thereon during the on-oil portion of the reforming cycle. The catalyst in its preferrred aspects will contain platinum in absolute amount is usually supported on the carrier within the range of from about 0.1 to about 1.0 percent, preferably from about 0.2 to about 0.7 percent, based on the weight of the catalyst (dry basis). Rhenium, or iridium, or rhenium and iridium, respectively, in absolute amount, is also usually supported on the carrier in concentration ranging from about 0.1 to about 1.0 percent, preferably from about 0.2 to about 0.7 percent, based on the weight of the catalyst (dry basis). Tin, where added to the support is preferably added before addition of the platinum and iridium, tin is added to the support in concentration ranging from about 0.02 percent to about 0.4 percent, preferably from about 0.05 to about 0.3 percent, based on the total weight of the catalyst (dry basis).

Catalyst performance is enhanced during the on-oil portion of reforming operations be adding a halogen component to the catalysts, fluorine and chlorine being preferred halogen components. The halogen is contained on the catalyst within the range of 0.1 to 3 percent, preferably within the range of about 1 to about 1.5 percent, based on the weight of the catalyst. When using chlorine as halogen component, it is added to the catalyst within the range of about 0.2 to 2 percent, preferably within the range of about 1 to 1.5 percent, based on the weight of the catalyst. The introduction of halogen into the catalyst can be carried out by any method at any time. It can be added to the catalyst during catalyst preparation, for example, prior to, following or simultaneously with the incorporation of the metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst, prior to initiation of the on-oil portion of the operating cycle, is dried by heating at a temperature above about 80° F., preferably between about 150° F. and 300° F., in the presence of nitrogen or oxygen, or both, in an air stream or under vacuum. The catalyst is calcined at a temperature between about 400° F. to 850° F., either in the presence of oxygen in an air stream or in the presence of an inert gas such as nitrogen.

Sulfur is a highly preferred component of the catalysts during reforming, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F., and at pressures ranging from about 1 to about 40 atmospheres for the time necessary to achieve breakthrough, or the desired sulfur level.

On completion of the on-oil portion of an operating cycle, the coked catalyst is regenerated by contact and treatment with a typical gaseous ozone-containing stream at the following typical, and preferred conditions of operation, to wit:

| Major Operating Variables | Typical Conditions of Regeneration | Preferred Conditions of Regeneration |
|---|---|---|
| Pressure, psig | 0–1000 | 0–250 |
| Temperature, °C. | 20–200 | 60–150 |
| Gas Rate, SCF/Hour/lb. Cat. | 5–500 | 5–50 |
| Concentration ozone in Regeneration gas, Vol. % | 1–50 | 3–10 |

The invention will be more fully understood by reference to the following examples and comparative data illustrating its more salient features. All parts are given in terms of weight except as otherwise specified.

EXAMPLES

To illustrate the use of ozone in regenerating a coked platinum, or polymetallic platinum catalyst, a series of runs were made with portions of a coked platinum-iridium (0.3% Pt/0.3% Ir) catalyst, the metallic hydrogeneration-dehydrogenation components of which were supported on gamma alumina (20–60 Angstroms, average pore size). Specimens of the catalyst which initially contained 2.5 wt. % carbon, were placed in a bed of 5 cm thickness and regenerated by contact at 20° C. to 170° C., over varying periods of time, with a gaseous stream of 3 vol. % ozone in air. Specimens of the catalyst, for comparative purposes, were also placed in a bed of 5 cm thickness and regenerated by contact at 400° C. in a stream containing 5 vol. % oxygen in air.

The results are summarized in Table 1A.

TABLE 1A

REGENERATION OF COKED PLATINUM/IRIDIUM CATALYST
Catalyst Carbon Before Regeneration: 2.5%

| | OZONE | | | | | | | OXYGEN |
|---|---|---|---|---|---|---|---|---|
| Run No. | 1 | 2 | 3 | 4 | 5 | 6 | 7 | 8 |
| Time, Hours | 18 | 5 | 6 | 2 | 6 | 7 | 6 | 6 |
| Space Velocity, SCF/hour/lb Cat | 130 | 130 | 130 | 130 | 52 | 52 | 52 | 52 |
| Pressure, psig | 0 | 0 | 0 | 0 | 0 | 7 | 7 | 0 |
| Temperatures | | | | | | | | |
| Inlet, °C. | 150 | 70 | 60 | 20 | 70 | 60 | 20 | 400 |
| Maximum, °C. | 170 | 120 | 102 | 52 | 113 | 112 | 26 | 450 |
| Ozone, wt % | 2.5 | 3.0 | 3.3 | 3.0 | 3.4 | 3.4 | 3.5 | OXYGEN, % 5 |
| Carbon, wt % | 1.2 | 0.5 | 0.8 | 1.7 | 0.5 | 0.4 | 1.8 | 0.4 |

TABLE 1A-continued
REGENERATION OF COKED PLATINUM/IRIDIUM CATALYST
Catalyst Carbon Before Regeneration: 2.5%

| | OZONE | | | | | | | OXYGEN |
|---|---|---|---|---|---|---|---|---|
| Carbon Removed, % | 52 | 80 | 70 | 30 | 80 | 85 | 30 | 85 |

In Run No. 1, as will be observed, an inlet temperature of 150° C. was employed. Carbon removal was only about 52%. At lower inlet temperatures, 70° C. in Run No. 1 and 60° C. in Run No. 3, it was found that a much larger amount of the carbon (70–80%) was removed. Run No. 4 conducted at an even lower inlet temperature, 20° C., however, resulted in only 30% carbon removal. Some further runs, i.e., Run Nos. 5 through 7, were carried out at a lower space velocity. As a result carbon removal remained maximized at 60°–70° C. Run No. 8 provided comparable data for oxygen regeneration. This shows that 85% carbon can be removed with oxygen at an inlet temperature of 400° C. Of course, little carbon removal can be achieved at the 60°–70° C. inlet temperature used with oxygen.

Runs 1 through 7, as when graphically plotted, show that carbon removal with ozone is maximized in the range 60°–70° C. inlet temperatures.

Reforming runs with a heptane feed were next made with portions of a platinum-iridium/gamma alumina catalyst (0.3 wt. % Pt/0.3 wt. % Ir), (A): a fresh catalyst; (B): a coked catalyst; (C): a specimen of the coked catalyst, B supra, regenerated with oxygen (5 Vol. % $O_2$ in air) at 425° C., without agglomeration of the iridium; (D): a specimen of the coked catalyst, B supra, regenerated with ozone (3 Vol. % $O_3$ in air) at 70° C. inlet temperature; and (E): a specimen of the coked catalyst, B supra, regenerated with oxygen (5 Vol. % $O_2$ in air) at 510° C. with agglomeration of the iridium. Specimens of Catalyst A, B, C, D and E were chloride equilibrated, hydrogen reduced and sulfided under identical conditions for use in conducting a series of reforming runs at identical conditions.

Measurements were made of the activity and selectivity of each catalyst while reforming heptane at 350 psig. The conditions of the operation and run average results are given in Table 1B.

TABLE 1B
HEPTANE REFORMING AT 350 PSIG
480° C., 80 W/H/W, $H_2Oil$ = 3, 4 Hour Average

| CATALYST DESCRIPTION | A Fresh | B Coked | C Oxygen @ 400° C. | D Ozone @ 70° C. | E Oxygen @ 510° C. |
|---|---|---|---|---|---|
| | | | ← REGENERATED → | | |
| Yield wt % | | | | | |
| $C_{5+}$ | 81.7 | 95.7 | 83.8 | 85.6 | 91.8 |
| Toluene | 9.4 | 1.4 | 7.9 | 7.6 | 3.3 |
| Heptane/Conversion | 40.9 | 7.5 | 35.4 | 32.0 | 17.9 |

Indications of catalyst performance for activity are toluene yield and heptane conversion. Data obtained at 30 minute intervals are given in FIG. 1, A and B. The activities of the catalysts regenerated with ozone at 70° C. (D), and with oxygen at 425° C. (C), respectively, are shown to be comparable and close to that of the fresh catalyst (A).

The coked catalyst (B) is shown to be deactivated. The catalyst regenerated with oxygen at 510° C. (E) showed low activity due to iridium agglomeration.

These data thus show quite clearly that carbon on the platinum-iridium catalyst was reduced to less than 0.5 wt. % using a gaseous stream containing 3.5 vol. % ozone at 60°–100° C. treating at a duration of about 6 hours with a space velocity in the range 50–200 SCF/hour/lb of catalyst. In contrast, treatment of the catalyst with oxygen to burn a corresponding amount of carbon from the coke required a minimal temperature of 400° C. At the low temperature required for removal of the carbon by ozone regeneration the structure of the base was not detrimentally affected, nor were the catalyst metals agglomerated. Moreover, the consumption of energy by the ozone regeneration was far less than required by oxygen regeneration of the catalyst.

It is apparent that various modifications and changes can be made without departing the spirit and scope of the invention.

Having described the invention, what is claimed is:

1. A process for the regeneration of a coked platinum-alumina, or polymetallic-platinum alumina reforming catalyst, which comprises contacting said catalyst with a gaseous stream of ozone in air, said stream containing from about 1 percent to about 50 percent ozone, based on the volume of the gas, at temperature ranging from about 60° C. to about 120° C. and at a space velocity of from about 50 to about 200 standard cubic feet per hour per pound of catalyst sufficient to burn and substantially deplete said catalyst of sufficient carbon to restore the activity of the catalyst to substantially that of the corresponding fresh catalyst.

2. The process of claim 1 wherein the catalyst is comprised of platinum, or polymetallic platinum component supported on gamma alumina.

3. The process of claim 1 wherein the catalyst is comprised of platinum and a metal selected from Group IV, VII or VIII of the Periodic Table of the Elements.

4. The process of claim 1 wherein the catalyst is comprised of platinum and a metal selected from the group consisting of tin, iridium and rhenium.

5. The process of claim 1 wherein during regeneration of the catalyst the pressure ranges from about 0 psig to about 1000 psig.

6. The process of claim 5 wherein the pressure ranges from about 0 psig to about 250 psig.

* * * * *